United States Patent

Wüstholz

[11] Patent Number: 6,149,231
[45] Date of Patent: Nov. 21, 2000

[54] HEADREST WITH GAS BAG MODULE

[75] Inventor: Bernd Wüstholz, Flein, Germany

[73] Assignee: TRW Occupant Restraint Systems GmbH & Co., Alfdorf, Germany

[21] Appl. No.: 09/314,475

[22] Filed: May 18, 1999

[30] Foreign Application Priority Data

May 18, 1998 [DE] Germany ............ 298 08 982 U

[51] Int. Cl.[7] .................. B60R 21/22; B60N 2/42
[52] U.S. Cl. .............. 297/216.12; 297/391; 280/730.1
[58] Field of Search ............. 297/216.12, 216.13, 297/216.14, 391; 280/728.1, 730.1

[56] References Cited

U.S. PATENT DOCUMENTS

| | | |
|---|---|---|
| 3,514,124 | 5/1970 | Richardson ............... 280/728.1 |
| 3,632,132 | 1/1972 | Richardson . |
| 3,703,313 | 11/1972 | Schiesterl et al. ............ 280/730.1 |
| 4,946,191 | 8/1990 | Putsch . |
| 5,211,696 | 5/1993 | Lacy ........................ 297/391 X |
| 5,324,071 | 6/1994 | Gotomyo et al. . |
| 5,435,594 | 7/1995 | Gille ........................ 280/730.1 |
| 5,466,001 | 11/1995 | Gotomyo et al. . |
| 5,472,230 | 12/1995 | Every et al. ............. 280/730.1 X |
| 5,601,332 | 2/1997 | Schultz et al. ......... 297/216.13 X |
| 5,738,407 | 4/1998 | Locke ..................... 297/216.12 |
| 5,833,312 | 11/1998 | Lenz ....................... 297/216.12 |

FOREIGN PATENT DOCUMENTS

| | | |
|---|---|---|
| 1576978 | 6/1969 | France . |
| 3741637 | 6/1989 | Germany . |
| 3900495 | 7/1990 | Germany . |
| 4137719 | 9/1992 | Germany . |
| 4334896 | 4/1995 | Germany . |
| 5-16758 | 1/1993 | Japan ................ 280/730.1 X |
| 5049523 | 3/1993 | Japan . |
| 9132102 | 5/1997 | Japan . |

*Primary Examiner*—Anthony D. Barfield
*Attorney, Agent, or Firm*—Tarolli, Sundheim, Covell, Tummino & Szabo L.L.P.

[57] ABSTRACT

A headrest intended to be mounted to a backrest of a vehicle seat includes a headrest pad with an impact surface for the head of an occupant, a base body which has a cavity and a support by which said headrest is adapted to be secured to a vehicle seat backrest, and an exchangeable gas bag module which is at least partially inserted into said cavity of said base body. The gas bag module forms a unit of a gas bag and a gas generator adapted to inflate the gas bag in the case of restraint and having a module pad which at least partially forms the headrest pad of the headrest.

11 Claims, 5 Drawing Sheets

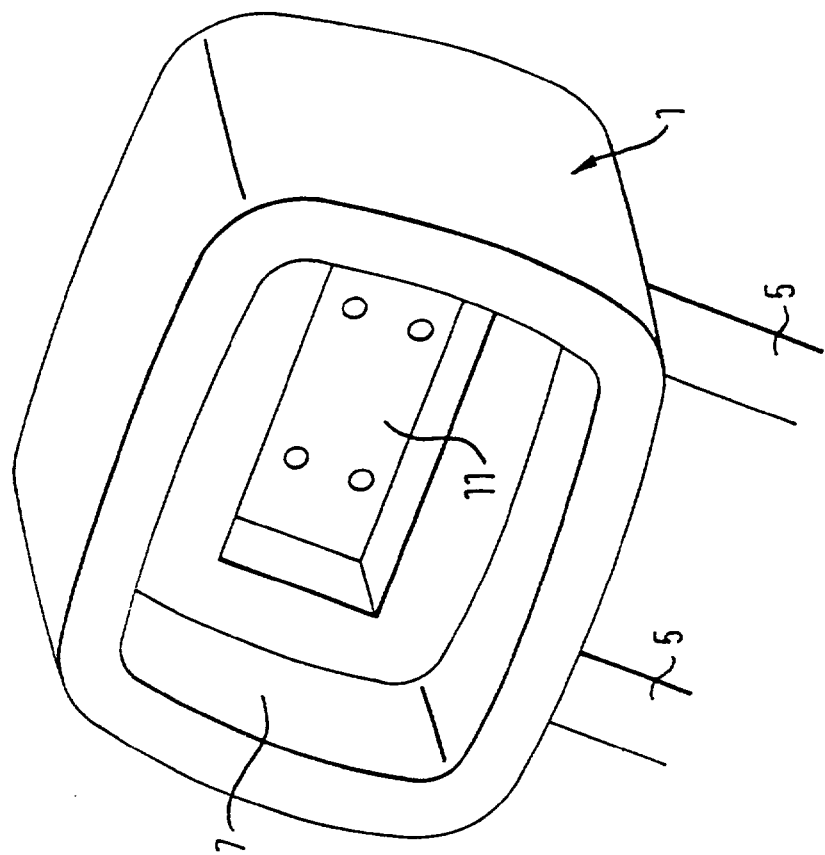
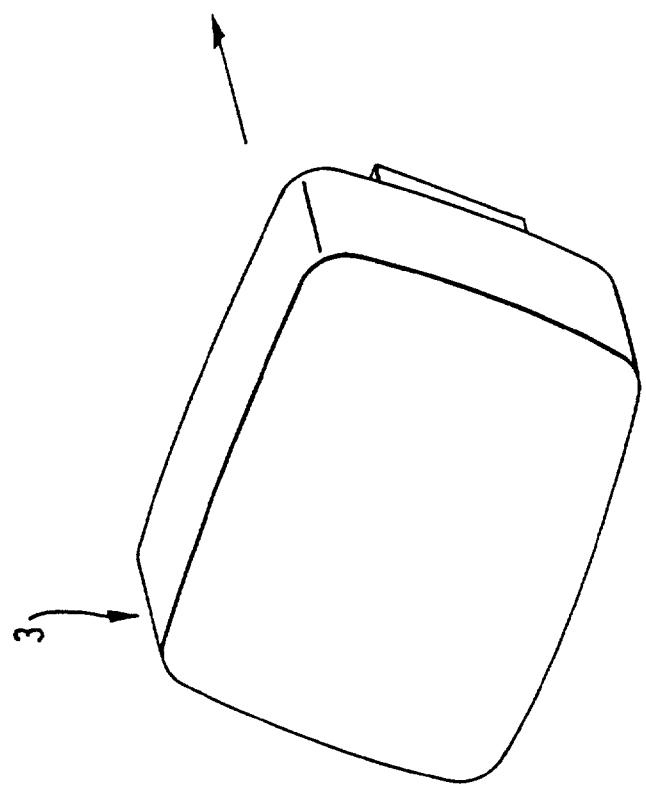
FIG.1

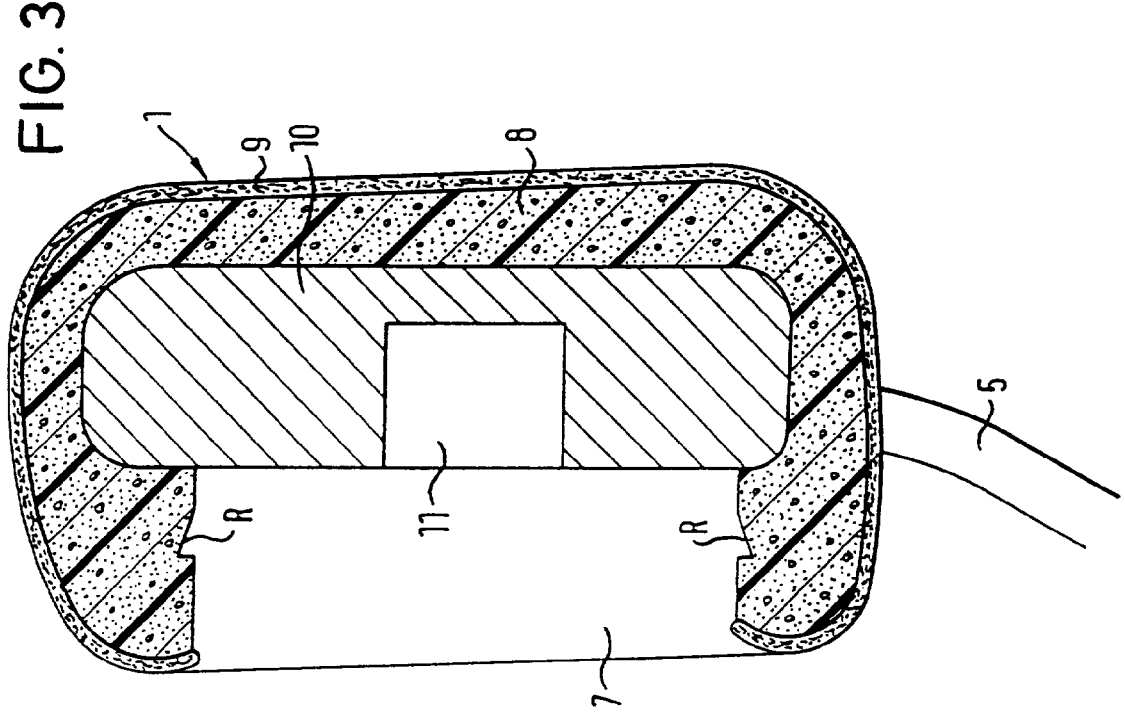
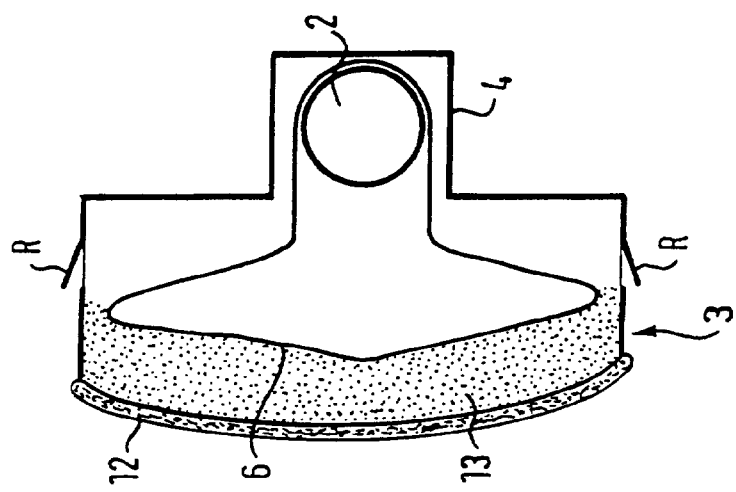

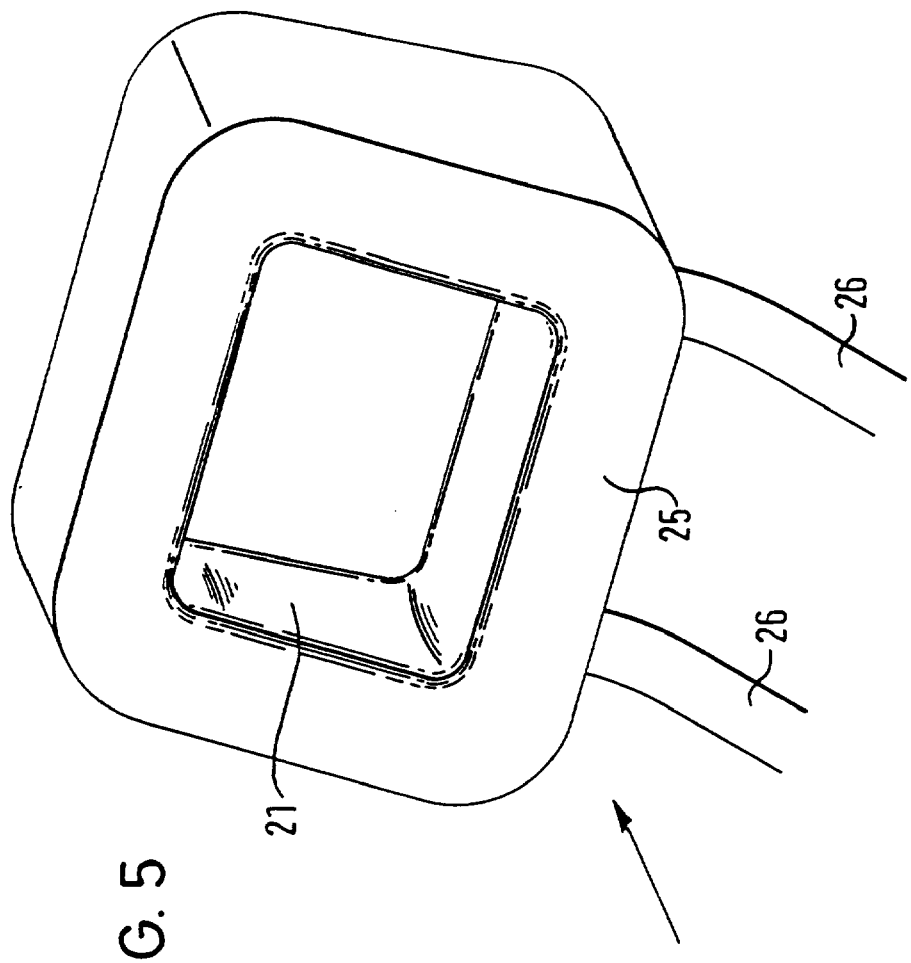
FIG. 5
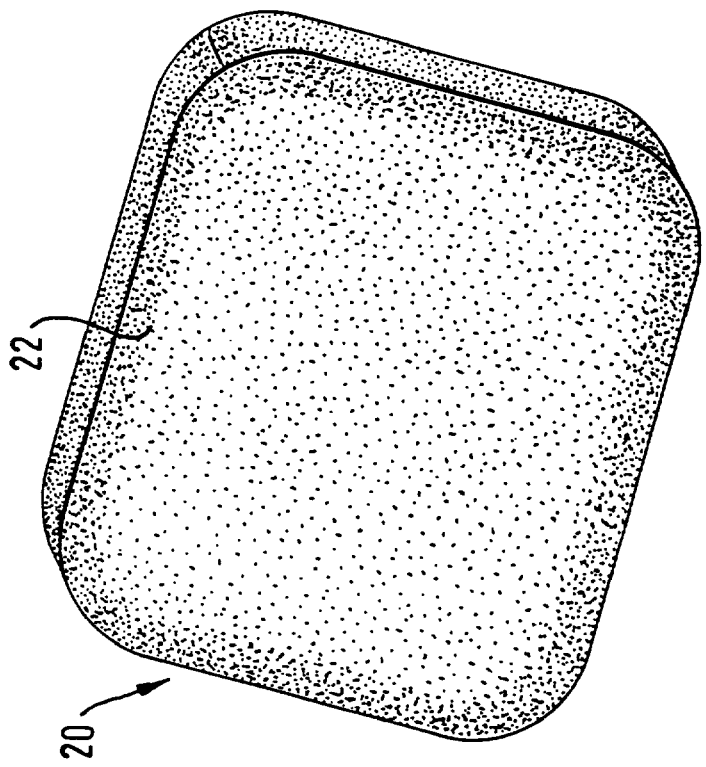

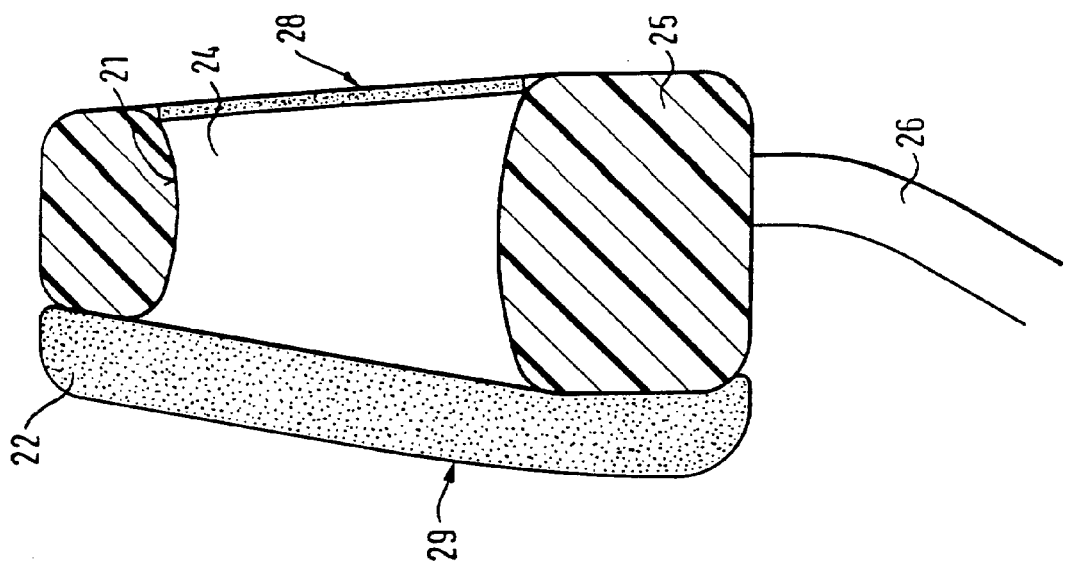
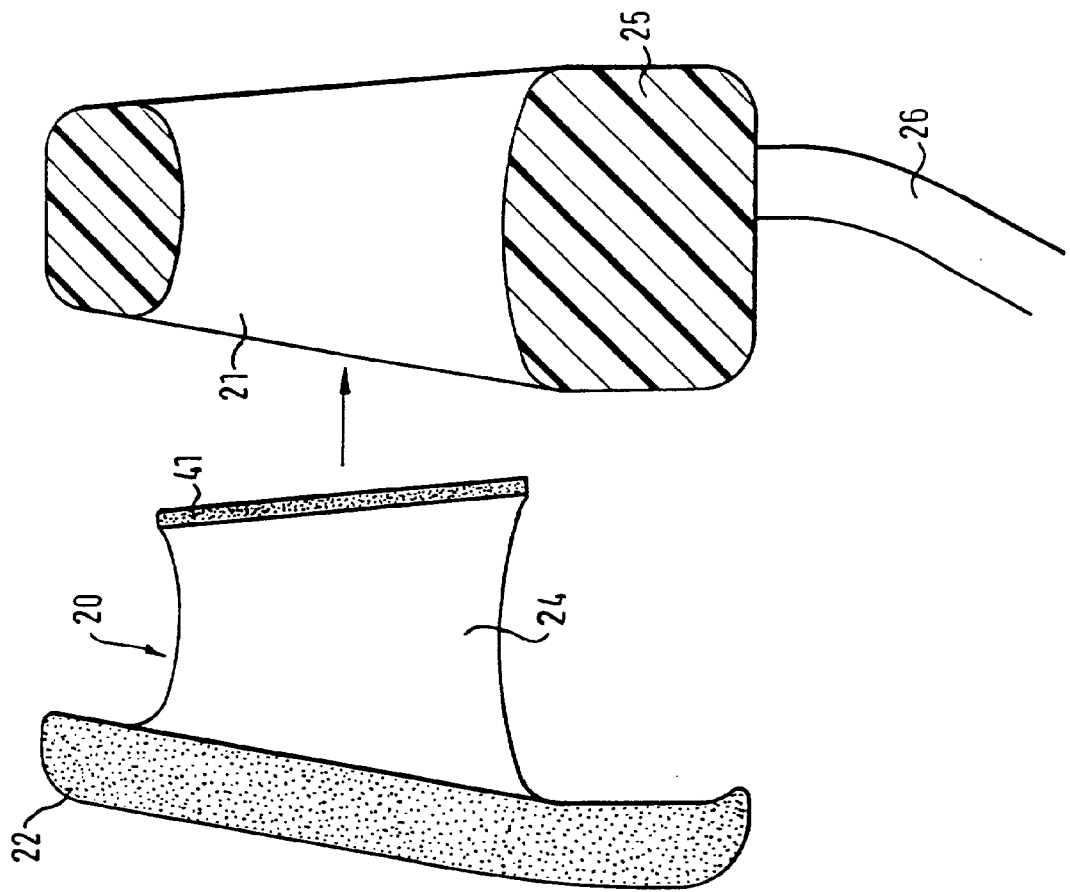

HEADREST WITH GAS BAG MODULE

The present invention relates to a headrest for arrangement on the backrest of a vehicle seat. In addition, the present invention relates to a gas bag module and a base body for use in the headrest.

BACKGROUND OF THE INVENTION

Such headrests include a headrest pad with an impact surface for the head of the occupant, a base body, and a gas bag module which is at least partially inserted into a receiving means of the base body and which forms a unit of a gas bag and a gas generator for inflating the gas bag in the case of restraint.

In the case of a rear impact, a headrest is generally intended, inter alia, to prevent the head of a vehicle occupant from being thrown toward the rear relative to the vehicle. Usually, the headrest has a padding or a headrest pad which provides the impact surface of the headrest in the case of restraint. The headrest pad extends at least on the front face of the headrest.

In German Utility Model DE 297 10 511 a vehicle seat is described with a backrest and with an adjustable headrest, which has a support surface which, in the case of restraint, is touched by the head of the vehicle occupant sitting on the vehicle seat. The known headrest comprises substantially in the interior a body of inherently stable material, on the rear face of which a bearing bracket having bearing rods is secured, for mounting on the backrest of the seat. A pre-assembled gas bag module, consisting of gas bag and gas generator, is fastened by a screw- and clip connection to the body on the front face of the internal body. A padding element, constructed as a shaped part, and a rear padding element are applied to the body and to the gas bag module, respectively. The components of the headrest are held together by a cover. The mounting and dismantling of the known headrest is costly because a relatively large number of individual elements, such as front pad, rear pad, cover, gas bag unit and body with support have to be assembled with corresponding fastening means in order to form the headrest.

It is an object of the present invention to provide a headrest which is simple to install.

BRIEF DESCRIPTION OF THE INVENTION

This problem is solved by the headrest intended to be mounted to a backrest of a vehicle seat includes a headrest pad with an impact surface for the head of an occupant, a base body which has a receiving means and a support by which said headrest is adapted to be secured to a vehicle seat backrest, and an exchangeable gas bag module which is at least partially inserted into said receiving means of said base body. The gas bag module forms a unit of a gas bag and a gas generator adapted to inflate the gas bag in the case of restraint and having a module pad which at least partially forms the headrest pad of the headrest. Further, the invention provides gas bag module for such headrest and a base body adapted thereto.

The headrest according to the invention for arrangement on the backrest of a vehicle seat includes a headrest pad with an impact surface for the occupant, a base body which has a receiving means which is accessible from the exterior, i.e. is open towards the exterior, and a support by which the headrest is secured to the backrest, and an exchangeable gas bag module which is at least partially inserted into the receiving means of the base body, the gas bag module forming a unit of a gas bag and a gas generator for inflating the gas bag in the case of restraint and having a module pad which at least partially forms the headrest pad of the headrest on the front face of the headrest.

The present invention has the decisive advantage that the installation of the headrest according to the invention is very simple. In fact, the gas bag module only has to be inserted into the receiving means, provided for this, of the base body of the headrest, in order to form the complete headrest. Thereby, in the final installation of the headrest according to the invention, merely two components are to be taken into account, whereby the installation is considerably simplified and an incorrect installation, as in conventional headrests with various components, is avoided, When the case of restraint has taken place and the gas bag of the headrest has been activated, the used gas bag module merely needs to be removed from the receiving means of the headrest base body and a new unused gas bag module, ready for operation, needs to be inserted into the receiving means again, in order to provide the crash-active function of the headrest again. The headrest according to the invention therefore makes possible an easy exchangeability of the gas bag module, without the entire headrest, in particular the base body of the headrest, having to be dismantled. Furthermore, the headrest according to the invention generally can be reused after the case of restraint, except the gas bag module itself, because generally only the gas bag module has to be replaced, whereas the base body normally remains undamaged in the case of restraint.

The base body of the headrest preferably has a base body pad which forms a part of the headrest pad of the headrest and surrounds the module pad of the inserted gas bag module like a frame, e.g. on the front face of the headrest, when the gas bag module is inserted into the receiving means of the base body. Hereby, a particularly stable fixing of the gas bag module in the receiving means of the base body is made possible.

Preferably the gas bag module and the base body are adapted to be fastened to each other by means of a latching connection, so that on insertion the gas bag module snaps into the base body, whereby a further facilitation exists during assembly of the headrest according to the invention, because no tools or individual parts are necessary for fastening and accommodating the gas bag module on the base body of the headrest.

Preferably the module pad of the gas bag module forms the entire headrest pad of the front face of the headrest, whereby the production of the entire headrest is simplified, because one padding is able to be produced more quickly and more simply than several individual padding elements which have to be joined to each other.

Preferably, the mounting of the base body and the gas bag module are adapted to each other in terms of shape such that the gas bag module which is inserted into the receiving means is held with an interlocking fit in the receiving means. This means that the gas bag module is held in the receiving means or on the base body only by the conformation of the contact surfaces of gas bag module and receiving means. For example, the gas bag module can have a convex and/or concave surface which fits or snaps into a correspondingly concave or convex surface of the receiving means wall, whereby a simple assembly and also exchangeability is made possible without additional fastening elements.

Preferably the base body of the headrest is constructed as a frame which has a receiving means for the gas bag module, the receiving means extending from the front face to the rear face of the base body. This embodiment of the headrest according to the invention makes possible the retrofitting of a gas bag module, or the supplementing of an already present, so-called frame headrest with a gas bag module, in order to form a crash-active headrest.

The gas bag module preferably has a module pad which forms at least a part of the headrest pad on the rear face of the headrest. This plays a part in particular in connection with an existing frame headrest in order to provide this with a pad on the rear face too, whereby an improved impact protection is provided for an occupant sitting rearward in the vehicle.

Further advantageous further developments of the headrest according to the invention can be seen from the respective sub-claims.

The gas bag module according to the invention adapted for incorporation into a receiving means of a headrest for arrangement on the backrest of a vehicle seat, the headrest having a headrest pad with a headrest surface or impact surface for the occupant's head on a front face and/or rear face of the headrest, is exchangeable and includes a unit of a gas bag and a gas generator for inflating the gas bag in the case of restraint and includes includes a module pad which at least partially forms the headrest pad of the headrest.

As was explained previously with reference to the headrest according to the invention, the gas bag module according to the invention makes possible a simple installation of the headrest and also a correspondingly simple exchangeability or reinstallation of the headrest after a case of restraint. Advantageous further developments of the gas bag module according to the invention can be seen from the respective sub-claims.

The base body according to the invention adapted for a headrest for arrangement on the backrest of a vehicle seat has an externally accessible receiving means for a gas bag module, into which the gas bag module can be inserted in order to form a crash-active headrest with simple installation. Advantageous further developments of the base body according to the invention can be seen from the respective sub-claims.

Further advantages, advantageous further developments and possibilities of application of the present invention can be seen from the following description of embodiments of the invention in connection with the enclosed drawings, in which:

BRIEF DESCRIPTION OF THE DRAWINGS

FIG. 1 shows a perspective view of a first embodiment of the headrest according to the invention with an associated gas bag module according to the invention and with a base body according to the invention;

FIG. 2 shows a sectional view of the gas bag module according to the invention of FIG. 1;

FIG. 3 shows a sectional view of the base body according to the invention of the headrest of FIG. 1;

FIG. 5 shows a perspective view of a second embodiment of the headrest according to the invention with an associated gas bag module according to the invention and with an associated headrest base body;

FIG. 6 shows a lateral view of the gas bag module and of the base body of the headrest in section according to the embodiment of the invention of FIG. 5; and FIG. 7 shows a view of the second embodiment of the invention of FIGS. 5 and 6 in the installed state.

DETAILED DESCRIPTION OF THE INVENTION

Figure 4:
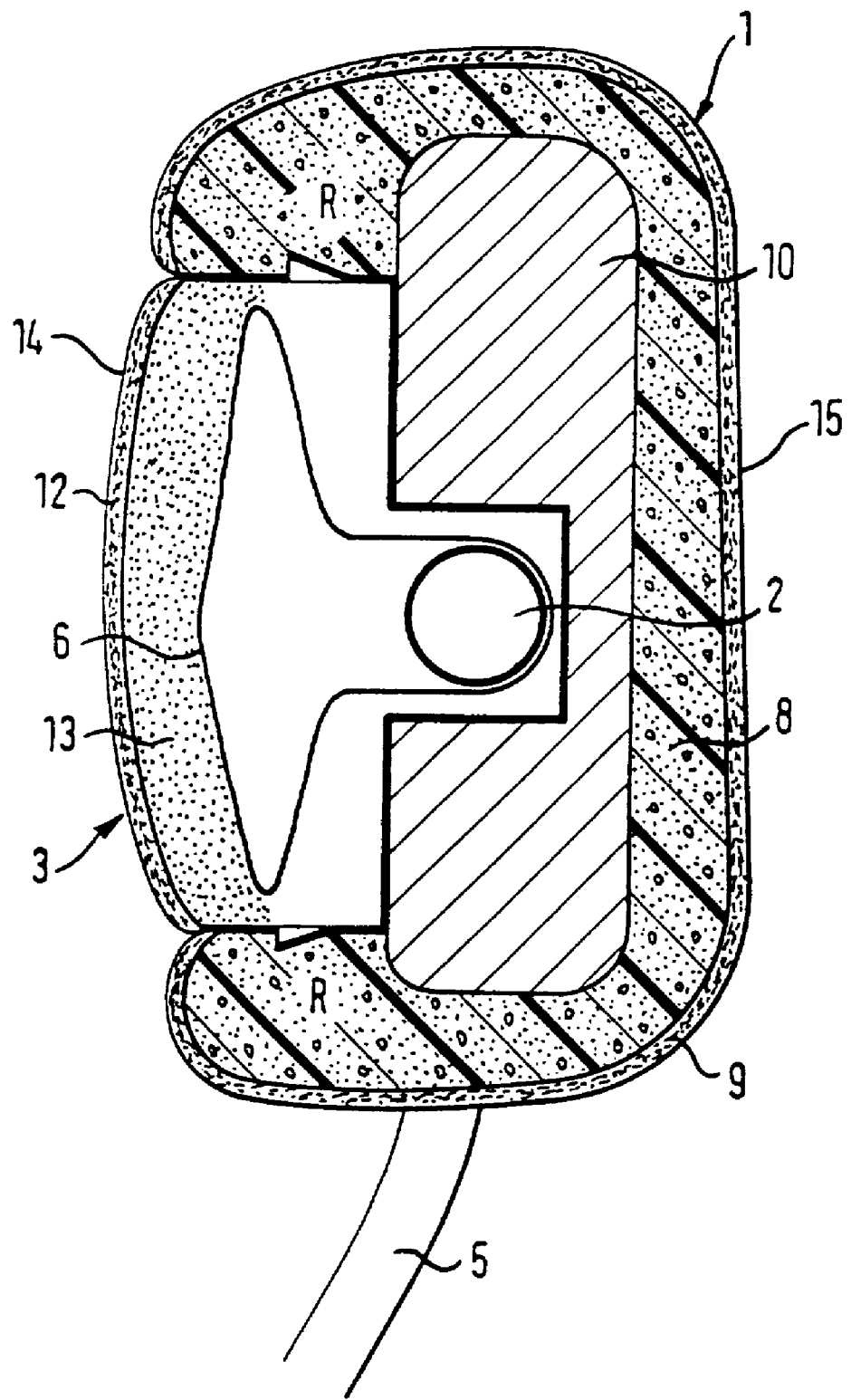
FIG. 4 shows a sectional view through the assembled embodiment of FIGS. 1 to 3.

In FIGS. 1 to 4 a first embodiment of the headrest according to the invention is shown, which comprises a gas bag module 3 and a base body 1.

The gas bag module 3 according to the invention of FIG. 2 comprises a gas generator 2 which is arranged in a housing 4 provided on the rear face on the gas bag module 3. The gas bag module 3 further comprises a module pad 13, e.g. consisting of foamed material, which is provided on the front face with an upper material 12 or with a cover or a styling and in which a folded gas bag 6 is integrated, which is connected with the gas generator 2, is inflated by the latter in the case of restraint and emerges through the module pad 13 from the headrest in order to reduce the distance to the head of the occupant.

The base body 1 of the headrest according to the invention, in accordance with the first embodiment, comprises an inner stable body 10 of plastic or metal, to which a support means 5 is fastened, which consists of a bracket with rods and which supports the headrest on the backrest of the respective vehicle seat. The body 10 carries a base body pad 8 of foamed material which surrounds in a frame shape the body 10 and also an externally accessible receiving means 7 on the front face 14 of the base body 1. As can be seen from FIG. 4, the base body pad 8 extends from the rear face 15 to the front face 14 of the headrest according to the invention and is in turn provided on its exterior with an upper material 9, a cover or a styling. The body 10 has a recess 11 which is open towards the receiving means 7. The housing 4 of the gas bag module 3 fits into the recess 11 of the base body 1 of the headrest according to the invention. Furthermore, the module pad 13 fits into the receiving means 7 of the base body 1 of the headrest. The gas bag module 3 fills the receiving means 7 completely and closes off the receiving means 7 towards the front face 14 of the headrest, towards which the gas bag unfolds when released. The module pad 13 here forms on the front face a part of the headrest padding, the end faces of the base body pad 8 on the front face and the module pad 6 together forming the headrest pad on the front face 14 of the headrest.

On the base body 1 of the headrest and on the gas bag module 3, latching connections R (hooks and recesses) are provided, which ensure a snapping in of the gas bag module 3 on insertion of the gas bag module 3 into the receiving means 7 of the base body 1 to secure the gas bag module 3 on and in the base body 1 of the headrest. The latching connections are constructed so as to be detachable, in order to make possible an exchanging of the gas bag module 3, e.g. after a case of restraint.

The gas generator 2 has a plug connector (not shown) which is able to be inserted into an associated plug connector of the body 10 of the base body 1, in order to obtain a continuous electrical signal connection between the gas generator 2 and, for example, a central airbag control arrangement, for activating the gas generator 2 in the case of restraint. The airbag control arrangement is connected via an electrical lead with the plug connector on the body 10.

In FIGS. 5 to 7 a second embodiment of the headrest according to the invention is shown, which comprises an associated gas bag module 20 and a base body 25 in the form of an existing frame headrest.

The gas bag module 20 has a large-surface module pad 22 to which a housing 24 adjoins on the rear face, in which housing the gas generator with the gas bag is accommodated in a protected manner. The surface of the housing 24 extends starting from the module pad 22 depressed in a concave manner in a saddle shape. The housing 24 consists of an elastic plastic material which permits a predetermined elastic deformation.

The base body 25 of the headrest according to the invention has in turn a support 26, is constructed in a frame shape and has a continuous opening or receiving means 21 which is open towards the exterior on a front face 29 and on a rear face 28—of course only when the gas bag module 20 is not inserted into the receiving means 21—and which is surrounded by the base body 25 like a frame. The surfaces on the inner face in the receiving means 21 are curved in a convex manner and are adapted in shape to the housing 24 of the gas bag module 20.

If the gas bag module 20 is inserted into the receiving means 21 of the base body 25, the housing 24 is elastically deformed at its exterior, so that it can be inserted into the receiving means 21 and finally snaps into the receiving means 21. The housing 24, in the snapped-in position, is secured in the base body 25 of the headrest according to the invention by the mutual convex and concave fitting of the surface of the housing 24 and of the surfaces of the base body 25 on the inner face in the base body 25. The module pad 22 covers the entire base body 25 of the headrest with regard to surface on the front face 29 of the headrest and thus forms the entire headrest pad on the front face 29.

On the rear face 28 of the housing 24 of the gas bag module 20, a rear pad 41 can be arranged, which forms or supplements the padding of the headrest on the rear face 28 with the gas bag module 20 inserted into the receiving means 21.

What is claimed is:

1. A headrest for mounting to a backrest of a vehicle seat, said headrest comprising:
    a headrest pad having an impact surface for receiving the head of an occupant sitting on the vehicle seat;
    a base body having receiving means for receiving an exchangeable gas bag module and a support for securing said headrest to the vehicle seat backrest; and
    an exchangeable gas bag module which is at least partially inserted into said receiving means of said base body, said gas bag module comprising:
        an inflatable gas bag;
        a gas generator for inflating said gas bag; and
        a module pad forming at least a portion of said headrest pad of said headrest;
        said gas bag, when inflated by said gas generator, emerging through said module pad.

2. The headrest of claim 1 wherein said headrest has a front face, said headrest pad being arranged on said front face.

3. The headrest of claim 2 wherein said module pad of said gas bag module forms the entire headrest pad on said front face of said headrest.

4. The headrest of claim 1 wherein said headrest has a back face, said headrest pad being arranged on said back face.

5. The headrest of claim 1 wherein said base body has a base body pad which forms part of said headrest pad and which surrounds said module pad of said gas bag module to form a frame when said gas bag module is inserted into said receiving means of said base body.

6. The headrest of claim 1 wherein said gas bag module is secured to said base body by a snap fit connection.

7. The headrest of claim 1 wherein said receiving means of said base body and said gas bag module have complementary shapes so that, when said bag module is inserted into said receiving means, said gas bag module is held with an interlocking fit in said receiving means.

8. The headrest of claim 1 wherein said base body of said headrest is constructed as a frame, said receiving means for receiving a gas bag module extending from a front face to a rear face of said frame.

9. An exchangeable gas bag module for incorporation into a receiving means of a headrest adapted for arrangement on a backrest of a vehicle seat, said gas bag module comprising:
    a gas bag;
    a gas generator adapted to inflate said gas bag in the case of restraint;
    a module pad which forms at least a portion of an impact surface for the head of an occupant; and
    a first part of a latching connection for securing said gas bag module to the headrest.

10. The gas bag module of claim 9 wherein said module pad is adapted to form at least a part of a headrest pad on a rear face of the headrest.

11. The gas bag module according to claim 9 further comprising a housing in which said gas generator and said gas bag are accommodated, said housing comprising a second part of said latching connection.

* * * * *